US011299148B2

United States Patent
Yamashita (10) Patent No.: US 11,299,148 B2
(45) Date of Patent: Apr. 12, 2022

(54) TRAVEL CONTROL APPARATUS AND VEHICLE

(71) Applicant: HONDA MOTOR CO., LTD., Tokyo (JP)

(72) Inventor: Shohei Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 16/789,822

(22) Filed: Feb. 13, 2020

(65) Prior Publication Data

US 2020/0180613 A1    Jun. 11, 2020

Related U.S. Application Data

(63) Continuation of application No. PCT/JP2017/030575, filed on Aug. 25, 2017.

(51) Int. Cl.
*B60W 30/09* (2012.01)

(52) U.S. Cl.
CPC ..... *B60W 30/09* (2013.01); *B60W 2554/4045* (2020.02); *B60W 2554/801* (2020.02); *B60W 2554/802* (2020.02); *B60W 2554/804* (2020.02); *B60W 2720/24* (2013.01)

(58) Field of Classification Search
CPC .......... B60W 30/09; B60W 2554/804; B60W 2554/802; B60W 2554/4045; B60W 2554/801; B60W 2720/24; B60W 2754/20; B60W 2556/50; B60W 60/00274;

(Continued)

(56) References Cited

U.S. PATENT DOCUMENTS 10,800,455 B2    10/2020  Micks et al.
2005/0228588 A1  10/2005  Braeuchle et al.
(Continued)

FOREIGN PATENT DOCUMENTS

CN    106891888 A    6/2017
JP    2005-524135 A  8/2005
(Continued)

OTHER PUBLICATIONS

English_Translation_WO2016024318A1 (Year: 2016).*
(Continued)

*Primary Examiner* — Peter D Nolan
*Assistant Examiner* — Ashley L Redhead, Jr.
(74) *Attorney, Agent, or Firm* — Westerman, Hattori, Daniels & Adrian, LLP (57) ABSTRACT

The present invention provides a travel control apparatus for controlling traveling of a self-vehicle to avoid another vehicle on a front side, the apparatus comprising: a calculation unit for calculating a relative speed between the self-vehicle and the other vehicle; a state detection unit for detecting an operation state of the other vehicle; and a control unit for controlling avoidance processing of avoiding the other vehicle and causing the self-vehicle to pass a lateral side of the other vehicle, wherein the control unit changes a separation distance to separate the self-vehicle and the other vehicle in the avoidance processing in accordance with the relative speed calculated by the calculation unit and the operation state detected by the state detection unit.

7 Claims, 8 Drawing Sheets

(58) Field of Classification Search
CPC ..... B60W 30/18163; B60W 2554/806; B60W 2552/05; B60W 2554/4042; G08G 1/16
See application file for complete search history.

(56) References Cited

U.S. PATENT DOCUMENTS

| | | | |
|---|---|---|---|
| 2012/0235853 A1* | 9/2012 | Takeuchi | B60W 30/0953 342/71 |
| 2015/0224987 A1 | 8/2015 | Tachibana | |
| 2016/0059855 A1* | 3/2016 | Rebhan | B60W 30/095 701/41 |
| 2016/0229410 A1 | 8/2016 | Clarke et al. | |

FOREIGN PATENT DOCUMENTS

| | | |
|---|---|---|
| JP | 2011-108016 A | 6/2011 |
| JP | 2014-80046 A | 5/2014 |
| WO | 2016/024318 A1 | 2/2016 |
| WO | WO-2016024318 A1 * | 2/2016 ............ B60W 30/08 |

OTHER PUBLICATIONS

International Search Report dated Nov. 21, 2017, issued in counterpart International Application No. PCT/JP2017/030575. (2 pages).
Office Action dated Jul. 5, 2021, issued in counterpart CN application No. 201780092677.4, with English translation. (22 pages).

* cited by examiner

TRAVEL CONTROL APPARATUS AND VEHICLE

CROSS-REFERENCE TO RELATED APPLICATION(S)

This application is a continuation of International Patent Application No. PCT/JP2017/030575 filed on Aug. 25, 2017, the entire disclosures of which is incorporated herein by reference.

BACKGROUND OF THE INVENTION

Field of the Invention

The present invention relates to a travel control technique for a vehicle.

Description of the Related Art

In automated driving of a vehicle, the vehicle is sometimes caused to travel on a lateral side of another vehicle to avoid the other vehicle on the front side. Japanese Patent Laid-Open No. 2014-080046 discloses a method of making a vehicle travel while expanding an avoidance track, which is used to cause the self-vehicle to travel so as to avoid another vehicle (front vehicle) on the front side, in the advancing direction of the vehicle in accordance with the relative speed between the vehicle and the other vehicle.

When avoiding another vehicle on the front side, even in a plurality of situations in which the relative speeds between the self-vehicle and the other vehicle equal, if the operation state (for example, the absolute speed) of the other vehicle changes, the peripheral status of the other vehicle may change. For this reason, in automated driving, an appropriate avoidance operation is preferably performed based on not only the relative speed between the self-vehicle and the other vehicle on the front side but also the operation state of the other vehicle.

It is an object of the present invention to perform an avoidance operation suitable for the state of another vehicle on the front side in automated driving of a vehicle.

SUMMARY OF THE INVENTION

According to the present invention, there is provided a traveling control apparatus for controlling traveling of a self-vehicle to avoid another vehicle on a front side, the apparatus comprising: a calculation unit for calculating a relative speed between the self-vehicle and the other vehicle; a state detection unit for detecting an operation state of the other vehicle; and a control unit for controlling avoidance processing of avoiding the other vehicle and causing the self-vehicle to pass a lateral side of the other vehicle, wherein the control unit changes a separation distance to separate the self-vehicle and the other vehicle in the avoidance processing in accordance with the relative speed calculated by the calculation unit and the operation state detected by the state detection unit.

According to the present invention, it is possible to perform an avoidance operation suitable for the state of another vehicle on the front side in automated driving of a vehicle.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
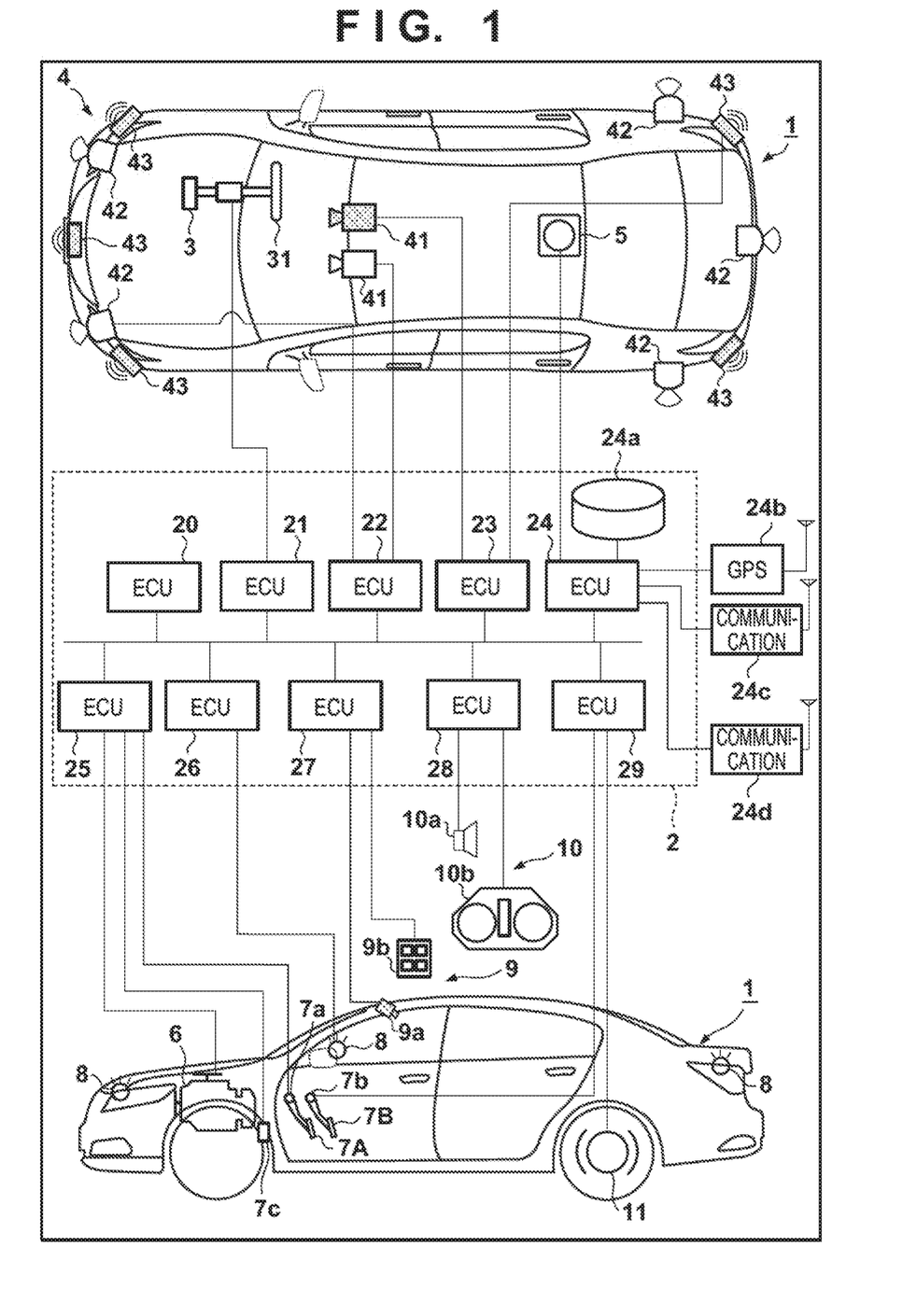
FIG. 1 is a block diagram of a vehicle control apparatus according to an embodiment of the present invention.

FIG. 1 is a block diagram of a vehicle control apparatus according to an embodiment of the present invention. The vehicle control apparatus shown in FIG. 1 is an apparatus that controls automated driving of a vehicle 1. Referring to FIG. 1, an outline of the vehicle 1 is shown in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with a support from the ECU 20 and controls the advancing direction of the vehicle 1.

The ECUs 22 and 23 perform control of detection units 41 to 43 that detect the peripheral status of the vehicle 1 and information processing of detection results. The detection unit 41 is a camera (to be sometimes referred to as the camera 41 hereinafter) that captures the front side of the vehicle 1. In this embodiment, two cameras 41 are provided at the roof front of the vehicle 1. When images captured by the cameras 41 are analyzed, the contour of a target or a division line (a white line or the like) of a lane on a road can be extracted.

The detection unit 42 is a lidar (Light Detection and Ranging (for example, a laser radar)) (to be sometimes referred to as the lidar 42 hereinafter), and detects a target around the vehicle 1 or measures the distance to a target. In this embodiment, five lidars 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle 1 are provided, the reliability of detection results can be improved. In addition, since detection units of different types such as cameras, lidars, and radars are provided, the peripheral environment of the vehicle can be analyzed multilaterally. Furthermore, each of the ECUs 22 and 23 can also detect (calculate) the relative speed between the vehicle 1 and a target around the vehicle 1 based on the distance between the vehicle 1 and the target measured by the lidars 42 and the radars 43, or detect (calculate) the absolute speed of a target around the vehicle 1 further based on the absolute speed information of the vehicle 1.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The ECU 24 includes a communication device 24d for inter-vehicle communication. The communication device 24d performs wireless communication with another vehicle on the periphery and performs information exchange between the vehicles.

The ECU 25 controls a power plant 6. The power plant 6 is a mechanism that outputs a driving force to rotate the driving wheels of the vehicle 1 and includes, for example, an engine and a transmission. The ECU 25, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 25 automatically controls the power plant 6 in correspondence with an instruction from the ECU 20 and controls the acceleration/deceleration of the vehicle 1.

The ECU 26 controls lighting devices (headlights, taillights, and the like) including direction indicators 8 (blinkers). In the example shown in FIG. 1, the direction indicators 8 are provided in the front portion, door mirrors, and the rear portion of the vehicle 1.

The ECU 27 performs control of a detection unit 9 that detects the status in the vehicle and information processing of a detection result. As the detection unit 9, a camera 9a configured to capture the inside of the vehicle and an input device 9b configured to accept input of information from an occupant in the vehicle are provided. In this embodiment, one camera 9a is provided at the roof front of the vehicle 1, and captures the state of the occupant in the vehicle. The input device 9b is a switch group arranged at a position where the occupant in the vehicle can operate the device and configured to input instructions to the vehicle 1.

The ECU 28 controls an output device 10. The output device 10 outputs information to the driver and accepts input of information from the driver. A voice output device 10a notifies the driver of the information by a voice. A display device 10b notifies the driver of information by displaying an image. The display device 10b is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

The ECU 29 controls a brake device 11 and a parking brake (not shown). The brake device 11 is, for example, a disc brake device which is provided for each wheel of the vehicle 1 and decelerates or stops the vehicle 1 by applying a resistance to the rotation of the wheel. The ECU 29, for example, controls the operation of the brake device 11 in correspondence with a driving operation (brake operation) of the driver detected by an operation detection sensor 7b provided on a brake pedal 7B. If the driving state of the vehicle 1 is automated driving, the ECU 29 automatically controls the brake device 11 in correspondence with an instruction from the ECU 20 and controls deceleration and stop of the vehicle 1. The brake device 11 or the parking brake can also be operated to maintain the stop state of the vehicle 1. In addition, if the transmission of the power plant 6 includes a parking lock mechanism, it can be operated to maintain the stop state of the vehicle 1.

In automated driving of the thus configured vehicle 1, if another vehicle (front vehicle) on the front side is detected, the vehicle 1 may be offset in the vehicle width direction and caused to pass on a lateral side of the other vehicle to avoid the other vehicle (to be sometimes referred to as avoidance processing hereinafter). When performing avoidance processing for the other vehicle on the front side, even in a plurality of situations in which the relative speeds between the vehicle 1 and the other vehicle equal, if the operation state (for example, the absolute speed) of the other vehicle changes, the peripheral status of the other vehicle may change. For this reason, in automated driving of the vehicle 1, appropriate avoidance processing is preferably performed based on not only the relative speed between the self-vehicle and the other vehicle on the front side but also the operation state of the other vehicle. For example, for another vehicle that is stopped on a road shoulder, there is a possibility that a pedestrian exists ahead of the other vehicle, or the door of the other vehicle opens. Hence, an avoidance operation considering the possibility is preferably performed. On the other hand, for another vehicle that is traveling at a low speed to stop on a road shoulder, the possibility that a pedestrian exists, or the door opens is low. Hence, a quick avoidance action is preferably taken.

The ECU 20 according to this embodiment changes the separation distance to separate the vehicle 1 and the other vehicle when performing avoidance processing for the other vehicle on the front side in accordance with the relative speed between the vehicle 1 and the other vehicle and the operation state of the other vehicle, which are detected (calculated) by the detection units (the cameras 41, the lidars 42, and the radars 43). This makes it possible to perform a safer avoidance operation for another vehicle that is stopped on a road shoulder and perform quicker avoidance processing for another vehicle that is traveling at a low speed to stop on a road shoulder. That is, an appropriate avoidance operation can be performed in accordance with the operation state of another vehicle on the front side.

Figure 2:
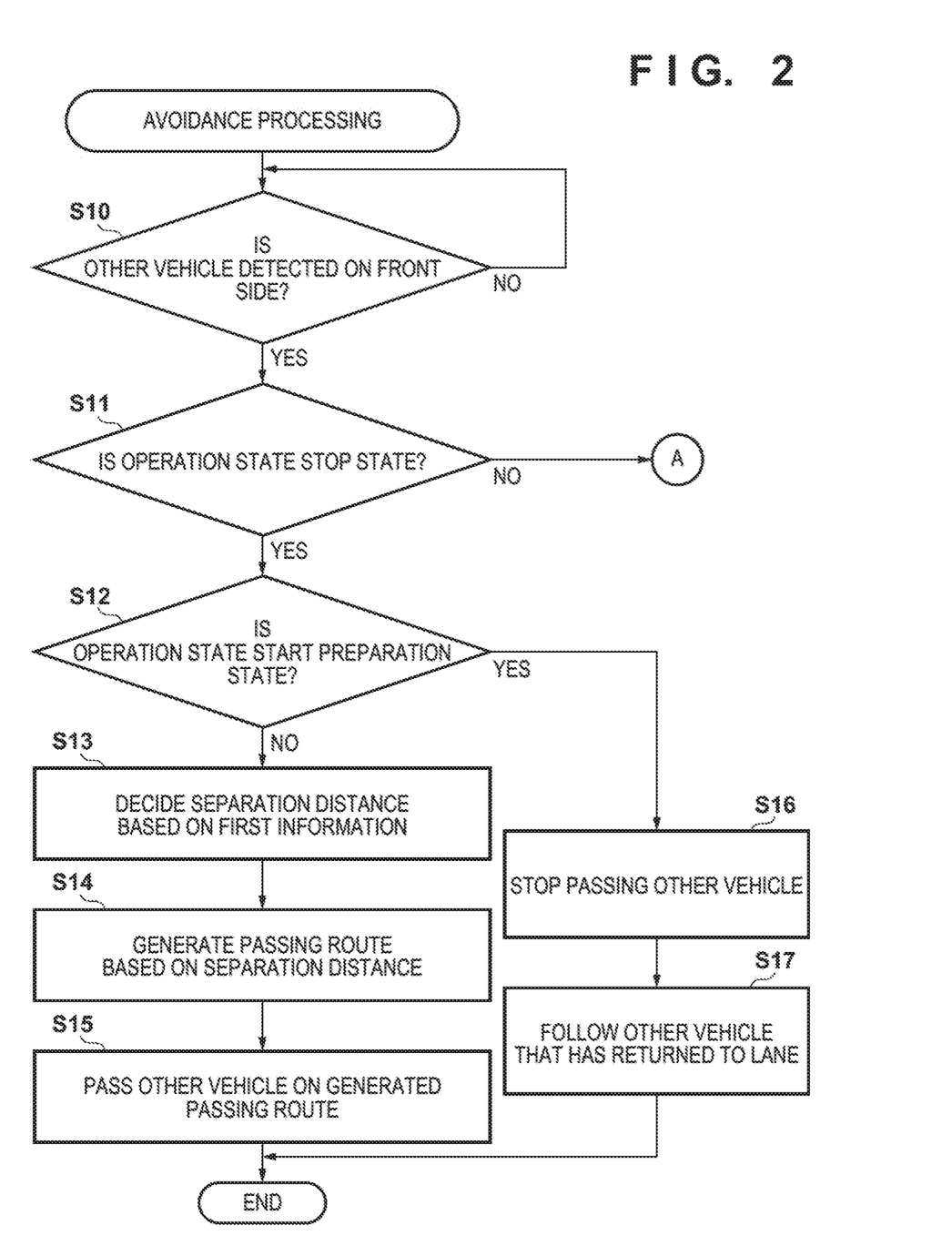
FIG. 2 is a flowchart showing an example of avoidance processing according to the embodiment.
Figure 3:
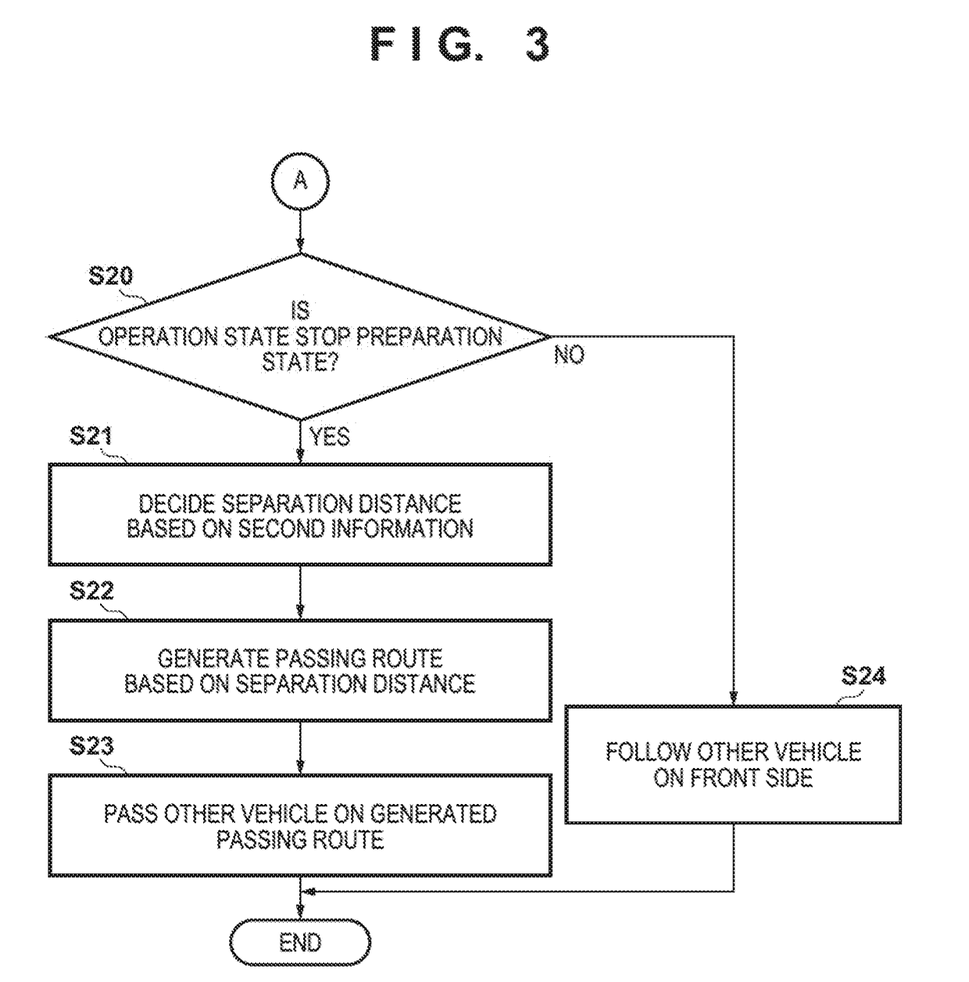
FIG. 3 is a flowchart showing an example of avoidance processing according to the embodiment.

Control of avoidance processing executed by the ECU 20 according to this embodiment will be described below with reference to FIGS. 2 and 3. FIGS. 2 and 3 are flowcharts showing an example of avoidance processing according to this embodiment. An example in which the vehicle passes another vehicle OV (four-wheeled vehicle) on the front side will be described here as avoidance processing in the following explanation. However, this embodiment can also be applied to a case in which the vehicle passes another vehicle that is traveling on an adjunct lane.

The flowchart shown in FIG. 2 will be described first. In step S10, the ECU 20 determines, based on the detection results of the detection units (the cameras 41, the lidars 42, and the radars 43), whether the other vehicle OV is detected on the front side. For example, the ECU 20 detects the other vehicle OV on the front side from images obtained by the cameras 41 using a known image analysis method, or detects the other vehicle OV on the front side by the lidars 42 and the radars 43. Upon determining that the other vehicle OV is detected on the front side, the process advances to step S11. Upon determining that the other vehicle OV is not detected on the front side, step S10 is repeated.

In step S11, the ECU 20 determines whether the operation state of the other vehicle OV on the front side detected in step S10 is a stop state. For example, the ECU 20 obtains the relative speed (speed difference) between the self-vehicle 1 and the other vehicle OV on the front side based on images obtained by the cameras 41 or the analysis results of the lidars 42 and the radars 43. Then, based on the obtained relative speed and the absolute speed (the value of a speed meter) of the self-vehicle 1, the absolute speed of the other vehicle OV is detected as the operation state. It can be determined, based on the detection result, whether the operation state of the other vehicle OV is the stop state. In this embodiment, the stop state is a state in which a vehicle is stopped on a lateral side (for example, a road shoulder) of a road. In addition to a state in which a vehicle is completely stopped (the absolute speed is 0 km/h), the stop state can include a state such as a creep traveling state in which a vehicle is traveling at a very low speed (for example, the absolute speed is 5 km/h or less).

Figure 4:
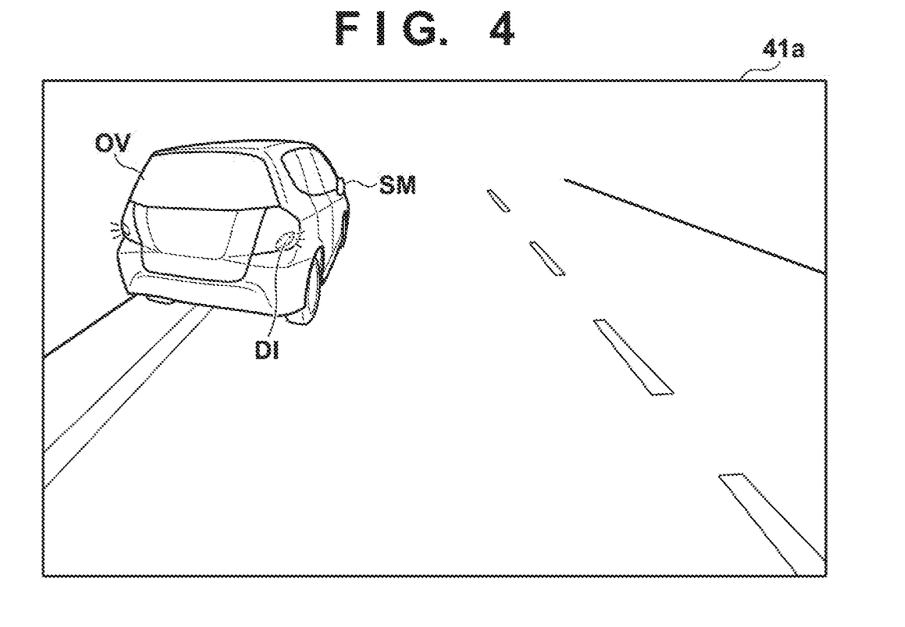
FIG. 4 is a view showing an image (another vehicle in a stop state) obtained by an in-vehicle camera.

In addition, the ECU 20 may analyze at least one of blinking of a direction indicator of the other vehicle OV on the front side, lighting of a brake lamp, and the orientation and position of the other vehicle OV from images obtained by the cameras 41 using a known image analysis method, and detect the operation state of the other vehicle OV based on the analysis result. More specifically, as shown in FIG. 4, if it is detected, in an image 41a of the other vehicle OV obtained by the cameras 41, that left and right direction indicators DI of the other vehicle OV are blinking (hazard lamp blinking state), and part of the other vehicle OV is located on the road shoulder, the ECU 20 may determine that the operation state of the other vehicle OV is the stop state. Furthermore, the ECU 20 may detect the open/close state of a side mirror SM from the image 41a of the other vehicle OV obtained by the cameras 41, and upon detecting that the side mirror SM of the other vehicle OV is closed, may determine that the operation state of the other vehicle OV is the stop state.

Upon determining in step S11 that the other vehicle OV on the front side is in the stop state, the process advances to step S12. Upon determining in step S11 that the other vehicle OV on the front side is not in the stop state, the process advances to the flowchart of FIG. 3. The flowchart of FIG. 3 will be described later.

Figure 9:
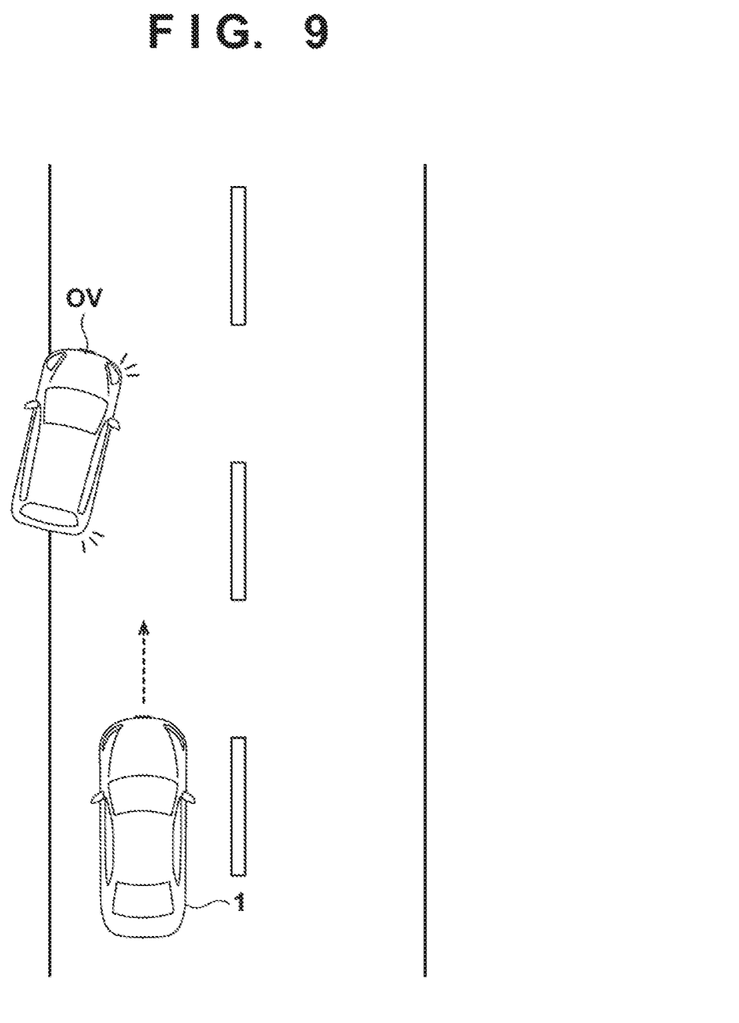
FIG. 9 is a view for explaining avoidance processing for another vehicle in a start preparation state.

In step S12, the ECU 20 determines whether the operation state of the other vehicle OV on the front side detected in step S10 is a start preparation state. The start preparation state is a state in which a vehicle is stopped on a lateral side (for example, a road shoulder) of a road but is going to return to the lane, as shown in FIG. 9. For example, upon detecting, from an image obtained by the cameras 41 using a known image analysis method, that only the direction indicator on the lane side (the right side if vehicles keep left) of the left and right direction indicators of the other vehicle OV is blinking, and the front portion of the other vehicle OV is directed to the lane, the ECU 20 can determine that the operation state of the other vehicle OV is the start preparation state. Upon determining that the other vehicle OV is not in the start preparation state (that is, the other vehicle OV is in the stop state), the process advances to step S13.

Figure 6:
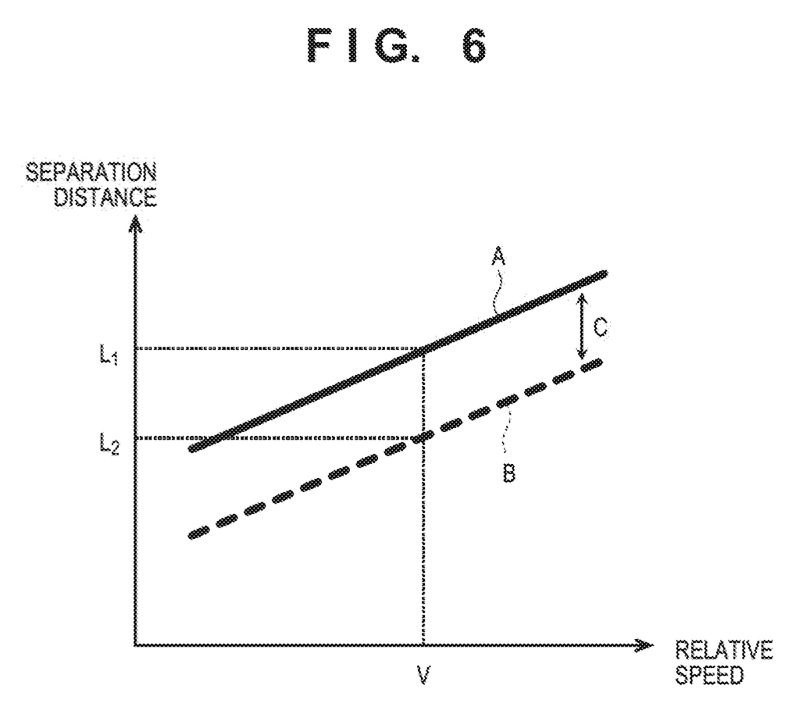
FIG. 6 is a view showing the relationship between a relative speed and a separation distance.

In step S13, the ECU 20 decides, based on the relative speed obtained in step S11, the separation distance to separate the self-vehicle 1 and the other vehicle OV when passing the other vehicle OV on the front side in the stop state (at the time of avoidance processing). For example, based on first information A representing the relationship between the relative speed and the separation distance when passing the other vehicle in the stop state, as shown in FIG. 6, the ECU 20 obtains a separation distance $L_1$ from a relative speed V obtained in step S11. The first information A shown in FIG. 6 is generated as information that represents the relationship between the relative speed and the separation distance and can cope with even a case in which a pedestrian runs out of the shade of the other vehicle on the front side in the stop state or a case in which the door of the other vehicle opens. In this embodiment, the first information A can be generated in advance in a form of an expression, a table, or the like and stored in the ECU 20.

Figure 7:
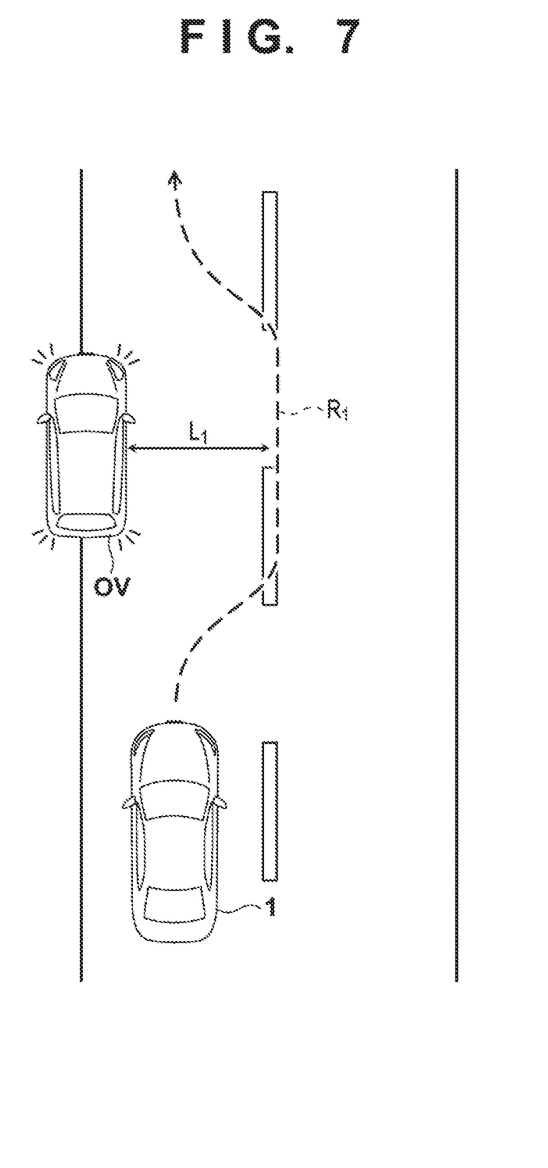
FIG. 7 is a view for explaining avoidance processing for another vehicle in a stop state.

In step S14, as shown in FIG. 7, based on the separation distance $L_1$ decided in step S13, the ECU 20 generates a passing route $R_1$ to pass the other vehicle OV in the stop state such that the route is apart from the other vehicle OV by the separation distance $L_1$. Then, in step S15, the vehicle passes the other vehicle OV by traveling on a lateral side of the other vehicle OV in accordance with the passing route $R_1$ decided in step S14.

On the other hand, upon determining in step S12 that the other vehicle OV is in the start preparation state, the process advances to step S16. In step S16, as shown in FIG. 9, the ECU 20 decelerates or stops the vehicle 1 to stop passing the other vehicle OV on the front side, and waits until the other vehicle OV on the front side returns to the lane. In step S17, the ECU 20 makes the vehicle 1 travel to follow the other vehicle OV that has returned to the lane (follow the other vehicle OV).

The flowchart shown in FIG. 3 will be described next.

Figure 5:
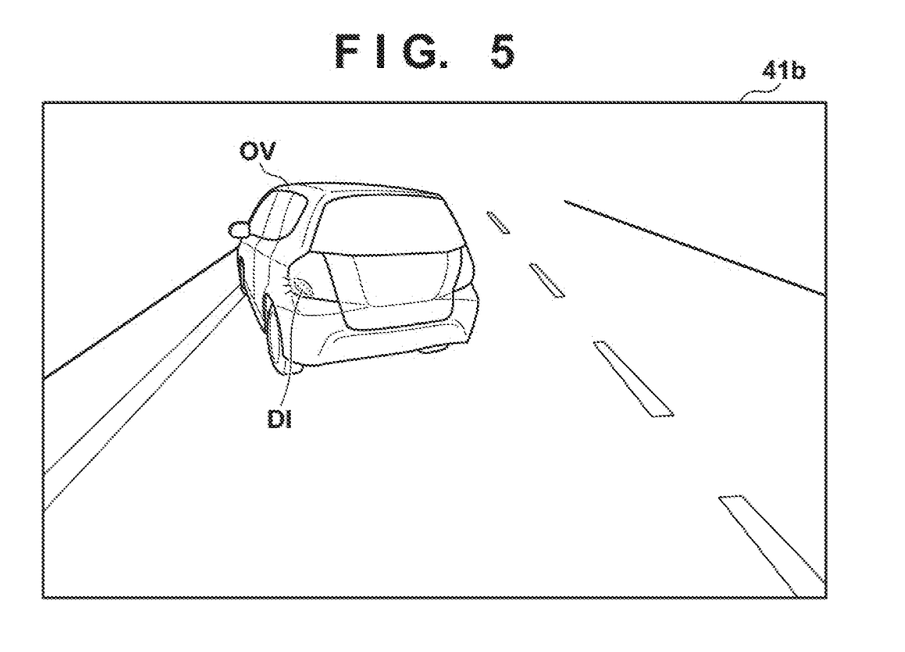
FIG. 5 is a view showing an image (another vehicle in a stop preparation state) obtained by an in-vehicle camera.
Figure 8:
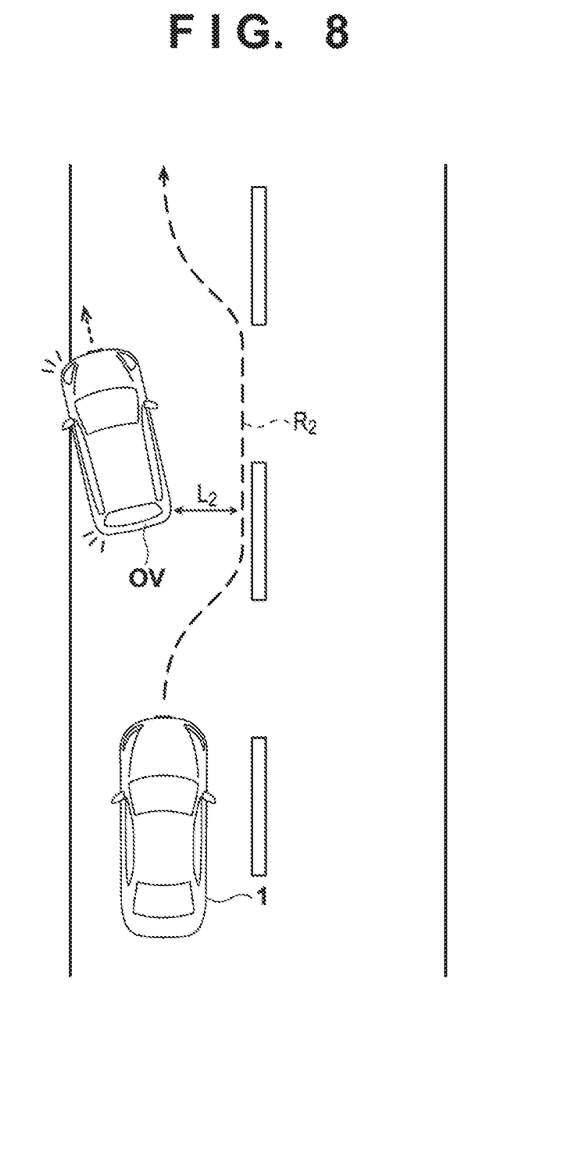
FIG. 8 is a view for explaining avoidance processing for another vehicle in a stop preparation state.

In step S20, the ECU 20 determines whether the operation state of the other vehicle OV on the front side detected in step S10 is the stop preparation state. The stop preparation state is a state in which a vehicle is traveling but is going to move from a lane to a lateral side (for example, a road shoulder) of a road and stop, as shown in FIGS. 5 and 8. For example, upon detecting, from an image 41b obtained by the cameras 41 using a known image analysis method, that only the direction indicator on the road shoulder side (the left side if vehicles keep left) of the left and right direction indicators of the other vehicle OV is blinking, and the front portion of the other vehicle OV is directed to the road shoulder, the ECU 20 can determine that the operation state of the other vehicle OV is the stop preparation state. Upon determining that the other vehicle OV is in the stop preparation state, the process advances to step S21. In this embodiment, it is determined in step S20 whether the other vehicle OV on the front side is in the stop preparation state. However, regardless of whether the other vehicle OV is going to stop, it may be determined only whether the other vehicle OV on the front side is in an operation state in which it is moving to the lateral side of the road. That is, in this case, whether the other vehicle OV on the front side will stop after moving to the lateral side of the road need not be included in the judgment factors.

In step S21, the ECU 20 decides, based on the relative speed obtained in step S11, the separation distance to separate the self-vehicle 1 and the other vehicle OV when passing the other vehicle OV on the front side in the stop preparation state (at the time of avoidance processing). For example, based on second information B representing the relationship between the relative speed and the separation distance when passing the other vehicle in the stop preparation state, as shown in FIG. 6, the ECU 20 obtains a separation distance $L_2$ from the relative speed obtained in step S11. Since the other vehicle OV in the stop preparation state is traveling although the speed is low, the possibility that a pedestrian runs out of the shade of the other vehicle, or the door of the other vehicle opens is very low. For this reason, the separation distance $L_2$ in a case in which the other vehicle OV is in the stop preparation state is decided (set) to a value smaller than the separation distance $L_1$ when passing the other vehicle in the stop state such that the vehicle can quickly pass the other vehicle. The second information B shown in FIG. 6 is generated as information representing the relationship between the relative speed and the separation distance, which makes the offset amount of the vehicle 1 as small as possible within a range to ensure safety. In this embodiment, the second information B can be generated in advance in a form of an expression, a table, or the like and stored in the ECU 20.

In step S22, as shown in FIG. 8, based on the separation distance $L_2$ decided in step S21, the ECU 20 generates a passing route $R_2$ to pass the other vehicle OV in the stop preparation state such that the route is apart from the other vehicle OV by the separation distance $L_2$. Then, in step S23, the vehicle passes the other vehicle OV by traveling on a lateral side of the other vehicle OV in accordance with the passing route $R_2$ decided in step S22.

On the other hand, upon determining in step S20 that the other vehicle OV is not in the stop preparation state, the process advances to step S24. In step S24, the ECU 20 judges that the operation state of the other vehicle OV on the front side detected in step S10 is none of the stop state, the stop preparation state, and the start preparation state, and the other vehicle OV is normally traveling on the lane, and causes the vehicle to travel following the other vehicle on the front side (follow the other vehicle OV).

As described above, in this embodiment, when passing the other vehicle OV on the front side, the operation state of the other vehicle OV is detected from the detection results of the detection units 41 to 43, and the separation distance between the self-vehicle 1 and the other vehicle OV is changed in accordance with the detection result. This makes it possible to perform an appropriate avoidance operation in accordance with the operation state of the other vehicle on the front side.

In this embodiment, an example in which the information (the first information A and the second information B) representing the relationship between the relative speed and the separation distance is provided for each of a case in which the other vehicle OV on the front side is in the stop state and a case in which the other vehicle OV is in the stop preparation state has been described. However, the present invention is not limited to this. For example, the ECU 20 may hold only the first information A. If the other vehicle OV is in the stop preparation state, the ECU 20 may obtain the separation distance $L_2$ by correcting, by a correction value C, the separation distance $L_1$ obtained based on the first information A (see FIG. 6). The correction value C may be set in advance or may be set as needed in accordance with the road condition. This also applies to a case in which only the second information B is held.

Alternatively, the ECU 20 may obtain a reference separation distance in accordance with the relative speed, and obtain the separation distances $L_1$ and $L_2$ by correcting the reference separation distance by a correction value tempered for each of the stop state and the stop preparation state. Note that in this embodiment, the separation distance decided in step S13 or S21 may be applied not only in the vehicle width direction (the direction perpendicular to the advancing direction) of the vehicle 1 but also in the advancing direction of the vehicle 1.

In addition, the ECU 20 may hold the first information A and the second information B for each of types (for example, an expressway, a general road, a parking area, and lane width) of traveling roads on which the vehicle 1 can travel, and obtain the separation distance based on the first information A and the second information B selected in accordance with the type of the traveling road on which the vehicle 1 is actually traveling. More specifically, the ECU 20 determines the type (for example, an expressway, a general road, a parking area, and lane width) of the traveling road on which the vehicle 1 is currently traveling from the current position of the vehicle 1 detected by the GPS sensor 24b and map information obtained via the communication device 24c and stored in the database 24a. The ECU 20 then selects the first information A or the second information B from a plurality of pieces of stored information in accordance with the determined type of the traveling road, and performs the avoidance processing shown in the flowcharts of FIGS. 2 and 3 using the selected information. The ECU 20 can thus change the separation distance in accordance with the type of the traveling road on which the vehicle 1 is currently traveling.

Furthermore, in this embodiment, the operation state of the other vehicle OV on the front side is detected by the detection units (the cameras 41, the lidars 42, and the radars 43). However, the present invention is not limited to this. For example, the ECU 20 may detect the operation state of the other vehicle OV by inter-vehicle communication with the other vehicle OV via the communication device 24d.

Summary of Embodiment

1. A traveling control apparatus according to the above-described embodiment is
a traveling control apparatus for controlling traveling of a self-vehicle (for example, 1) to avoid another vehicle on a front side, comprising:
calculation unit (for example, 22, 23, 41-43) for calculating a relative speed between the self-vehicle and the other vehicle;
state detection unit (for example, 41) for detecting an operation state of the other vehicle; and
control unit (for example, 20) for controlling avoidance processing of avoiding the other vehicle and causing the self-vehicle to pass a lateral side of the other vehicle,
wherein the control unit changes a separation distance to separate the self-vehicle and the other vehicle in the avoidance processing in accordance with the relative speed calculated by the calculation unit and the operation state detected by the state detection unit.

According to this embodiment, it is possible to perform an appropriate avoidance operation in accordance with the operation state of the other vehicle on the front side.

2. In the above-described embodiment,
the state detection unit detects an absolute speed of the other vehicle as the operation state of the other vehicle, and
the control unit changes the separation distance in accordance with the absolute speed of the other vehicle detected by the state detection unit.

According to this embodiment, it is possible to determine whether the other vehicle on the front side is in the stop state and perform an appropriate avoidance operation.

3. In the above-described embodiment,
if the state detection unit detects that the other vehicle is in an operation state in which the other vehicle is going to move to a lateral side of a road, the control unit reduces the separation distance as compared to a case in which it is detected that the other vehicle is in an operation state in which the other vehicle is stopped on the lateral side of the road.

According to this embodiment, it is possible to perform a safer avoidance operation for the other vehicle in the operation state in which the other vehicle is stopped on the lateral side of the road, and take a quicker avoidance action for the other vehicle in the operation state in which the other vehicle is going to move to the lateral side of the road.

4. In the above-described embodiment,
if the state detection unit detects that the other vehicle is in an operation state in which the other vehicle is going to start from the lateral side of the road onto a lane, the control unit stops the avoidance processing.

According to this embodiment, it is possible to recognize, as a preceding vehicle, the other vehicle in the operation state in which the other vehicle is going to start onto the lane and perform safer automated driving.

5. In the above-described embodiment,
the state detection unit detects the operation state of the other vehicle based on at least one of lighting of a direction indicator of the other vehicle, lighting of a brake lamp of the other vehicle, and an orientation of the other vehicle.

According to this embodiment, it is possible to properly grasp the operation state of the other vehicle on the front side.

6. In the above-described embodiment,
the traveling control apparatus further comprises acquisition unit (for example, 20, 24a-24c) for acquiring a type of a traveling road on which the self-vehicle is traveling, and
the control unit changes the separation distance in accordance with the type of the traveling road acquired by the acquisition unit.

According to this embodiment, it is possible to perform an appropriate avoidance operation for the other vehicle on the front side in accordance with the traveling road of current traveling.

The present invention is not limited to the above-described embodiments, and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A travel control apparatus for controlling traveling of a self-vehicle to avoid another vehicle on a front side, the apparatus comprising:
a calculation unit for calculating a relative speed between the self-vehicle and the other vehicle;
a state detection unit for detecting an operation state of the other vehicle; and
a control unit for controlling avoidance processing of avoiding the other vehicle and causing the self-vehicle to pass a lateral side of the other vehicle,
wherein the control unit changes a separation distance to separate the self-vehicle and the other vehicle in the avoidance processing in accordance with the relative speed calculated by the calculation unit and the operation state detected by the state detection unit,
wherein in a case where the state detection unit detects that the other vehicle is in an operation state in which the other vehicle is going to move to a lateral side of a road, the control unit reduces the separation distance as compared to a case in which it is detected that the other vehicle is in an operation state in which the other vehicle is stopped on the lateral side of the road.

2. The travel control apparatus according to claim 1, wherein
the state detection unit detects an absolute speed of the other vehicle as the operation state of the other vehicle, and
the control unit changes the separation distance in accordance with the absolute speed of the other vehicle detected by the state detection unit.

3. The travel control apparatus according to claim 1, wherein in a case where the state detection unit detects that the other vehicle is in an operation state in which the other vehicle is going to start from the lateral side of the road onto a lane, the control unit stops the avoidance processing.

4. The travel control apparatus according to claim 1, wherein the state detection unit detects the operation state of the other vehicle based on at least one of lighting of a direction indicator of the other vehicle, lighting of a brake lamp of the other vehicle, and an orientation of the other vehicle.

5. The travel control apparatus according to claim 1, further comprising acquisition unit for acquiring a type of a traveling road on which the self-vehicle is traveling,
   wherein the control unit changes the separation distance in accordance with the type of the traveling road acquired by the acquisition unit.

6. A vehicle comprising a travel control apparatus according to claim 1.

7. A travel control method of controlling traveling of a self-vehicle to avoid another vehicle on a front side, the method comprising steps of:
   (i) calculating a relative speed between the self-vehicle and the other vehicle;
   (ii) detecting an operation state of the other vehicle; and
   (iii) by a processor, controlling avoidance processing of avoiding the other vehicle and causing the self-vehicle to pass a lateral side of the other vehicle,
   wherein the step (iii) further comprises changing a separation distance to separate the self-vehicle and the other vehicle in the avoidance processing in accordance with the calculated relative speed and the detected operation state,
   wherein in a case where the step (ii) detects that the other vehicle is in an operation state in which the other vehicle is going to move to a lateral side of a road, the step (iii) further comprises reducing the separation distance as compared to a case in which it is detected that the other vehicle is in an operation state in which the other vehicle is stopped on the lateral side of the road.

* * * * *